United States Patent
Hammad (10) Patent No.: US 8,005,737 B2
(45) Date of Patent: *Aug. 23, 2011

(54) RESTRICTING ACCESS TO COMPROMISED ACCOUNT INFORMATION

(75) Inventor: Ayman Hammad, Pleasanton, CA (US)

(73) Assignee: Visa U.S.A., Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/764,738

(22) Filed: Apr. 21, 2010

(65) Prior Publication Data

US 2010/0205077 A1    Aug. 12, 2010

Related U.S. Application Data

(63) Continuation of application No. 12/112,169, filed on Apr. 30, 2008, now Pat. No. 7,739,169.

(60) Provisional application No. 60/946,113, filed on Jun. 25, 2007.

(51) Int. Cl.
*G06Q 40/10* (2006.01)
(52) U.S. Cl. .......................................... 705/35; 705/44
(58) Field of Classification Search .................... 705/35, 705/44
See application file for complete search history.

(56) References Cited

U.S. PATENT DOCUMENTS

| 6,996,718 B1 * | 2/2006 | Henry et al. .................. 713/182 |
| 2007/0293202 A1 * | 12/2007 | Moshir et al. ............... 455/414.2 |
| 2008/0103800 A1 * | 5/2008 | Domenikos et al. .............. 705/1 |

OTHER PUBLICATIONS

No Author "Identity Thieves Beware: Lifelock Introduces Nation's First Guaranteed Proactive Solution to Identity Theft Protection." (Jun. 13, 2005).*

* cited by examiner

*Primary Examiner* — Ella Colbert
*Assistant Examiner* — Abdul Basit
(74) *Attorney, Agent, or Firm* — Kilpatrick, Townsend & Stockton, LLP (57) ABSTRACT

A notification service protects different user accounts from being exposed to fraudulent activity when one of the accounts is compromised. The notification service instructs an issuer of the compromised account to automatically close, freeze or place the other associated accounts on a watch list to prevent potential exposure to the other accounts due to a security breach associated with the compromised account. The card holder may receive notification of the compromised account from the notification service or the issuer via a mobile device. The mobile device may directly contact other issuers with one request to restrict access to any accounts associated with the compromised account. In the event that the compromised account is loaded on the mobile device, the account is cancelled and a new account is loaded to the mobile device.

22 Claims, 7 Drawing Sheets

RESTRICTING ACCESS TO COMPROMISED ACCOUNT INFORMATION

CROSS-REFERENCE TO RELATED APPLICATIONS

This application is a continuation of U.S. patent application Ser. No. 12/112,169, filed Apr. 30, 2008, which claims priority to U.S. Provisional Application No. 60/946,113 filed on Jun. 25, 2007, the complete disclosures of which are incorporated herein by reference.

BACKGROUND

Many consumers use a variety of payment devices when purchasing services and goods. Example payment devices include credit cards, debit cards, and devices configured to operate as a payment device such as a mobile phone. A payment device may be "compromised" when information associated with the payment device is no longer secure. Examples of information that a card holder maintains as secure include an account number, expiration date, card verification value (CVV), billing address, personal identification number (PIN), password, personal information (e.g., mother's maiden name, place of birth), etc. The payment device may be compromised when the card holder's wallet or purse is lost or stolen, when conducting an unsecured on-line purchase transaction, when account information has been accessed without authorization, or due to any other breach in security that exposes account data to unauthorized users.

Compromised payment devices increase the likelihood of consumers becoming victims of identity theft. In order to prevent being a victim of financial identity theft, a card holder notifies the institutions associated with the payment devices of the compromised accounts. As a result, the card holder's accounts may be frozen, cancelled or otherwise flagged that the accounts may be exposed to fraudulent activity.

In the event that one credit card is compromised, there is a strong likelihood that the card holder's other payment devices may also be compromised. In other words, if personal information for one card is stolen, the stolen information may be used to access other accounts because the stolen information may be commonly shared among the different cards (e.g., same PIN or mother's maiden name). Thus, the card holder would be required to notify the issuer of each payment device independently that the payment devices have been compromised.

In some cases, a card holder may be unaware that his credit card has been compromised until notified by a bank that detected suspicious account activity or was otherwise made aware of potentially compromised accounts. For example, a credit card was used at a specific merchant and the account information was accessed without authorization at the merchant. Since there is a likelihood that a card holder may have used more than one account at the same merchant, it is also likely that the other accounts may also be compromised. Thus, the merchant may notify the card holder of the potentially compromised accounts. The card holder would then be required to notify the issuers of each potentially compromised account to cancel or otherwise restrict access to the accounts. This process may be time consuming due to the number of credit cards that were compromised, whether the contact information for each issuer is available, whether the card holder has access to a phone or computer to notify the issuers, etc.

A card holder may register with an identity theft protection organization (e.g., LifeLock™) to protect accounts from being compromised. Generally, a card holder registers a variety of different accounts with the organization. When the card holder learns that one of the accounts may have been compromised, the card holder informs the organization of the potentially compromised account. The identity theft protection organization then notifies issuers of the card holder's other registered accounts of the potentially compromised accounts such that the issuers are informed that an identity theft may occur. This process requires that the card holder register each account for which protection is sought. However, other accounts may be compromised for which the card holder neglected to register with the identity theft protection organization. Therefore, these unregistered accounts would not be protected against identity theft.

What is desired is a method for restricting access to compromised payment devices, where such method overcomes the noted disadvantages of existing approaches.

SUMMARY

Embodiments of the invention are directed to restricting access to an account that may be compromised and automatically restricting access to other associated accounts that may also be compromised. A card holder registers different accounts with a notification service to protect the accounts from being exposed to fraudulent activity when one of the accounts is compromised. Other accounts associated with the compromised account may be identified even though the associated accounts are not registered with the notification service. The other accounts may be identified by information that is shared with the compromised account. The issuer of the compromised account may automatically close, freeze or place the compromised account and the associated accounts on a watch list to prevent potential exposure to the other accounts due to a security breach associated with the compromised account.

In some embodiments, the card holder may receive notification of the compromised account from the notification service or the issuer via a mobile device. The mobile device may directly contact other issuers with one request to restrict access to any accounts associated with the compromised account. When the account is loaded on the mobile device, the account is cancelled and a new account is loaded to the mobile device.

One embodiment of the invention is directed to a method including receiving notification of a compromised account. Access is restricted to the compromised account. Another account associated with the compromised account is identified. The other account is identified based on information that is shared between the other account and the compromised account. The other account is not pre-registered with an entity that identifies the other account. Access to the other account is then restricted.

One embodiment of the invention is directed to a mobile computing device that includes a processor. The processor is configured to receive notification of a compromised account. The processor also receives notification of another account associated with the compromised account. The other account is associated with the compromised account based on information that is shared with the compromised account. The other account is not pre-registered with an entity that identifies the other account. The processor is further configured to transmit a response to the received notifications. The response causes access to at least one of the compromised account or the other accounts associated with the compromised account to be restricted.

One embodiment of the invention is directed to a method including receiving an indication that an account associated with a virtual card associated with a mobile computing device is compromised. The mobile computing device is used to contact issuers of other virtual cards to notify the issuers that accounts associated with the other virtual cards could be potentially compromised.

One embodiment of the invention is directed to a mobile computing device that includes a processor and a computer readable medium. The computer readable medium comprises code for receiving an indication that an account associated with a virtual card associated with a mobile computing device is compromised, and code for contacting issuers of other virtual cards to notify the issuers that accounts associated with the other virtual cards could be potentially compromised.

These and other embodiments of the invention are described in further detail below.

DETAILED DESCRIPTION

Some embodiments of the invention are directed to restricting access to a compromised account and restricting access to other accounts that may also be compromised. The accounts may be associated with the same card holder or the same merchant. The issuer of the compromised account may automatically close, freeze, or place the compromised account on a watch list to prevent further exposure to fraudulent activity. Access is also restricted to any accounts associated with the compromised account to prevent potential exposure of the associated accounts due to the compromised account information that has been lost or exposed. For example, many card holders use the same personal identification number (PIN) for multiple accounts. Thus, even though only one account is compromised, restricting access to related accounts prevents the PIN of the compromised account from being used to access the other accounts.

In one illustrative example, a card holder loses his wallet containing multiple credit and debit cards. Some of the cards may have been registered with a notification service that identifies when one of the cards may have been compromised such that the other cards are not also exposed to fraudulent activity. The wallet is found by someone who buys merchandise using one of the card holder's credit cards. The issuer of the credit card determines that the transaction may be unauthorized and freezes the account used to buy the merchandise. For example, the issuer may detect a potential unauthorized use because the purchase total is significantly higher than other purchases commonly made by the card holder. The issuer then notifies the notification service of the potentially unauthorized transaction. In response to receiving the notification, the notification service may instruct the issuer to close the potentially compromised account. The notification service identifies other accounts associated with the potentially compromised account. The other accounts may have registered with the notification service or the notification service may identify the other accounts based on account information that is shared with the potentially compromised account. The notification service may then instruct issuers to close the other accounts associated with the potentially compromised account. Alternatively, the other accounts may be placed on a watch list for a predetermined amount of time. The accounts on the watch list are treated with enhanced security to prevent these credit/debit cards from also being fraudulently accessed due to the compromised account information.

In another illustrative example, a card holder notices an unauthorized transaction on her monthly credit card statement. The card holder contacts the card issuer to report the unauthorized charge. Alternatively, the issuer notifies the card holder of a potentially unauthorized transaction, and then contacts the notification service to put the card on a watch list. The reporting of the unauthorized transaction triggers an action that identifies other accounts associated with the card holder (i.e., accounts that share the same card holder information (e.g., billing address, date of birth, social security number, etc.)). A notification is then sent to the card holder from the notification service that other accounts may have been exposed to fraudulent activity depending on what happened to the card (e.g., one card lost, wallet lost, on-line account information accessed without authorization, etc.). The card holder may take action with one request to authorize each issuer to cancel or otherwise restrict access to the other accounts. Thus, the card holder does not need to contact each card issuer individually to restrict access to the potentially exposed accounts.

In another illustrative example, a mobile device associated with a card holder is used as a communication hub to contact issuers of potentially compromised accounts. An issuer may call or send a message to a cardholder's mobile device that one of his accounts has been compromised. The issuer also notifies the notification service that the account has been compromised so that the account is put on a watch list. The notification service identifies other accounts associated with the compromised account and adds the associated accounts to a watch list. The issuers are notified that the accounts on the watch list may be exposed to fraudulent activity. The notification service also notifies the mobile device about which accounts may have been exposed to a security breach and have been placed on the watch list. The card holder may reply that not only was one card lost, but an entire wallet was lost. In response, the notification service notifies the issuers to cancel all of the associated accounts.

In some embodiments, the notification service notifies the mobile device of the compromised account, and the mobile device notifies the issuers of the compromised account using one request. The issuers then inform the mobile device of other accounts that may also be compromised. The card holder then identifies which cards to provide enhanced security or restricted access. Alternatively, in response to the notification received from the notification service, the mobile device may directly contact the issuers with one request to cancel and reissue the compromised accounts.

In another illustrative example, a mobile phone is configured as a payment device. The mobile phone receives a message or a call from a bank (i.e., the issuer) that an account has been compromised and potentially exposed to fraudulent activity. The card holder uses the mobile device to inform the bank that the compromised account is loaded on the mobile phone (i.e., the account is a "virtual card"). The bank (or a third party agent acting on behalf of the bank) sends a notification to the mobile phone that causes the account that is loaded on the mobile phone to be cancelled. Immediately afterward, the bank sends new account information to the mobile phone. Thus, the card holder maintains a valid account on the mobile phone with only a slight interruption. The new account information may be automatically registered with the same notification service for detecting potentially compromised accounts.

In some embodiments, by registering accounts with the notification service, the card holder consents to having the notification service contact the corresponding issuers of the accounts. The card holder may also authorize which actions are performed after a compromised account is identified. For example, the card holder may configure the notification service to contact a credit bureau to perform a credit check whenever an account is identified as being compromised. The credit check provides additional security against potentially compromised accounts. In another example, some of the card holder's accounts may be linked (e.g., recurring payments, regular deposits, etc.). The card holder may enable the notification service to re-establish links between accounts after an account has been canceled and reissued. The notification service may also re-establish links in response to a notification from a mobile device after the new account is issued.

In one embodiment, a merchant may also be notified of a compromised credit account. For example, an on-line retailer may cancel an order after a notification of a compromised account is received such that the order is not shipped. Likewise, an airline may cancel a flight reservation paid for using a compromised account if the flight has not yet taken place. It is not necessary to notify all merchants. Rather, only those that have not yet completed a transaction associated with a compromised account need be notified.

Some embodiments of the present invention can be used with standard payment processing systems. Exemplary payment processing systems are described in further detail below.

Figure 1:
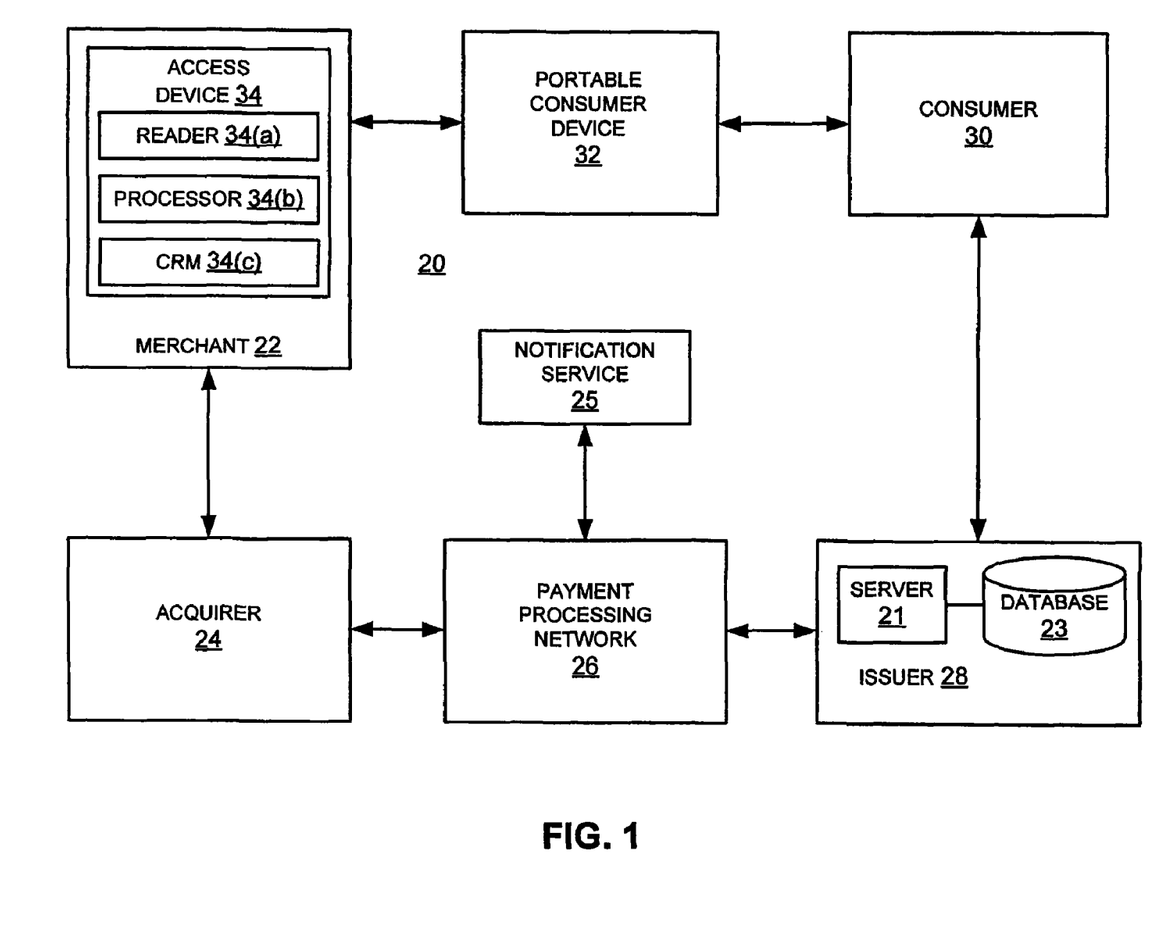
FIG. 1 shows a payment processing system that can be used in an embodiment of the invention.

FIG. 1 shows a payment processing system 20 that can be used in embodiments of the present invention. The system 20 includes a merchant 22 and an acquirer 24 associated with the merchant 22. In a typical payment transaction, a consumer 30 may purchase goods or services at the merchant 22 using a portable consumer device 32. The acquirer 24 can communicate with an issuer 28 via a payment processing network 26.

The acquirer 24 is typically a bank that has a merchant account. The issuer 28 may also be a bank, but could also be a business entity such as a retail store. Some entities are both acquirers and issuers, and embodiments of the invention include such entities. The issuer 28 may operate a server computer 21, which may have a computer readable medium comprising code for performing the functions that the issuer 28 performs. A database 23 comprising account information and other information may be operatively coupled to the server computer 21.

The consumer 30 may be an individual, or an organization such as a business that is capable of purchasing goods or services.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones (as described with reference to FIG. 4), personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a Visa Integrated Payments (VIP) system which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

In accordance with embodiments of the present invention, a notification service 25 is coupled to the payment processing network 26 to identify and restrict access to potentially compromised accounts that have been exposed to fraudulent activity. The operation of the notification service 25 is described in detail below with reference to FIGS. 2-5.

The merchant 22 may also have, or may receive communications from, an access device 34 that can interact with the portable consumer device 32. In FIG. 1, the access device 34 is located at the merchant 22. However, it could be located at any other suitable location in other embodiments of the invention.

The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may include a reader 34(a), a processor 34(b) and a computer readable medium 34(c). The reader 34(b) may include any suitable contact or contactless mode of operation. For example, exemplary card readers can include radio frequency (RF) antennas, magnetic stripe readers, etc., to interact with the portable consumer device 32.

In a typical purchase transaction, the consumer 30 purchases a good or service at the merchant 22 using a portable consumer device 32 such as a credit card. The consumer's portable consumer device 32 can interact with an access device 34 such as a point of sale (POS) terminal at the merchant 22. For example, the consumer 30 may take a credit card and may swipe it through an appropriate slot in the POS terminal. Alternatively, the POS terminal may be a contactless reader, and the portable consumer device 32 may be a contactless device such as a contactless card.

An authorization request message is then forwarded to the acquirer 24. After receiving the authorization request message, the authorization request message is then sent to the payment processing network 26. The payment processing network 26 then forwards the authorization request message to the issuer 28 of the portable consumer device 32.

After the issuer 28 receives the authorization request message, the issuer 28 sends an authorization response message back to the payment processing network 26 to indicate whether or not the current transaction is authorized (or not authorized). The payment processing network 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the access device 34, or may be printed out on a receipt.

At the end of the day, a normal clearing and settlement process can be conducted by the payment processing network 26. A clearing process is a process of exchanging financial details between the acquirer 24 and the issuer 28 to facilitate posting to a consumer's account and reconciliation of the consumer's settlement position.

Some of the embodiments described below may use a payment processing system like the one described above, or any suitable combination of components in the payment processing system.

Figure 2:
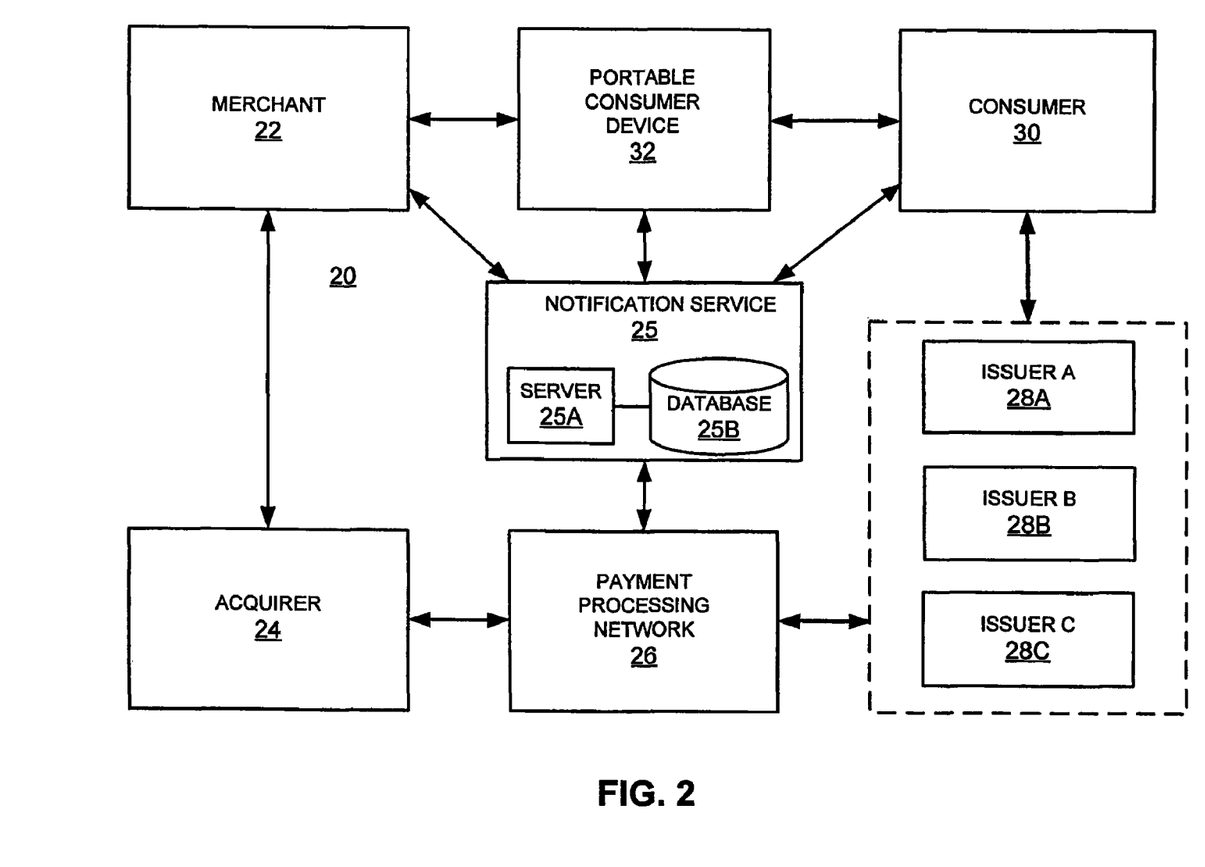
FIG. 2 shows a payment processing system that utilizes a notification service for identifying and restricting access to compromised accounts in accordance with embodiments of the invention.

FIG. 2 shows the payment processing system 20 that can be used with the notification service 25 to identify and restrict access to compromised accounts in accordance with embodiments of the invention. The system 20 is similar to the one described in FIG. 1. However, FIG. 2 differs from FIG. 1 by showing that the notification service 25 may communicate directly with the portable consumer device 32 when the portable consumer device 32 is a mobile computing device. The notification service 25 may also communicate directly with the merchant 22 or the consumer 30 by, for example, a computer network or any other means of communication. The notification service 25 may operate a server computer 25A, which may have a computer readable medium comprising code for performing the functions that the notification service 25 performs. A database 25B comprising account information and other information may be operatively coupled to the server computer 25A. The issuer 28 of FIG. 1 has been replaced by issuers 28A, 28B, 28C to indicate that the consumer 30 holds accounts with the different issuers 28A, 28B, 28C.

The consumer 30 registers with the notification service 25 by identifying different accounts (e.g., credit, debit, savings, etc.) that the consumer 30 wants to protect against exposure to potentially fraudulent activity. By registering the accounts, the consumer 30 consents to having the notification service 25 contact the corresponding issuers 28A, 28B, 28C of potentially compromised accounts. The notification service 25 identifies the accounts as being associated with the same consumer 30. The notification service 25 may also group accounts based on other criteria such as according to the same issuer 28A, 28B, or 28C, or according to which accounts were used at the same merchant 22.

In some embodiments, the consumer 30 need not register all of the accounts for which protection is sought. The notification service 25 may automatically identify associated accounts using account information that is commonly shared between different accounts. Examples of shared account information include personal information such as card holder name, billing address, date of birth, social security number, passwords, etc.

In some embodiments, the notification service 25 collects account information by monitoring the payment processing network 26. For example, as authorization requests and authorization responses are sent over the payment processing network 26 between the acquirer 24 and the issuers 28A, 28B, 28C, the notification service 25 can retrieve account information associated with a card holder using the server 25A. The retrieved account information may then be stored in the database 25B for subsequent access to identify accounts associated with a potentially compromised account. In another example, the notification service 25 collects account information from the financial details exchanged between the acquirer 24 and the issuers 28A, 28B, 28C during the normal clearing and settlement process conducted by the payment processing network 26.

The notification service 25 identifies an account as compromised when the account is potentially exposed to fraudulent activity. The account may be identified as compromised in response to a notification received from the consumer 30, the issuers 28A, 28B, or 28C, the acquirer 24, the merchant 22 or the portable consumer device 32 (e.g., when the portable consumer device 32 is a mobile device). For example, the consumer 30 may inform the issuers 28A, 28B, or 28C or the notification service 25 that an account has been compromised after the consumer 30 lost a credit card, had a wallet stolen, or otherwise had reason to believe that an account may be exposed to fraudulent activity (e.g., an unauthorized transaction on a monthly account statement). In another example, the issuers 28A, 28B, 28C or the acquirer 24 may identify an account as being potentially compromised in response to a sudden change in account activity (e.g., a dramatic increase in the amount charged to a credit account). In another example, the merchant 22 may notify the notification service 25 of a compromised account in the event that there is reason to suspect that the account information stored at the merchant 22 has been exposed to a security risk (e.g., an unauthorized user has accessed a secure database of consumer account information).

When the notification service 25 receives notification of a potentially compromised account, other associated accounts that may also be compromised are identified. For example, the notification service 25 determines which accounts associated with the same consumer 30 have been registered with the notification service 25. In another example, the notification service 25 identifies associated accounts that may not be registered based on information that is commonly shared between the potentially compromised account and other accounts. The commonly shared information is identified from the account information collected from the payment processing network 26 and stored in the database 25B.

The notification service 25 may then notify the consumer 30 and the issuers 28A, 28B, 28C of the potentially compromised accounts including the associated accounts. The notification may be sent to the consumer 30 in the form of a phone call or a mobile alert, and the notification may be sent to the issuers 28A, 28B, 28C via the payment processing network 26. Thus, the consumer 30 and the issuers 28A, 28B, 28C are given notice that other accounts may have been exposed to fraudulent activity and that an investigation is being performed to determine whether the card was lost, a wallet was stolen, etc.

In some embodiments, the issuer 28A, 28B, or 28C of the compromised account may automatically cancel the account. Any accounts associated with the compromised account may also be closed to prevent the associated accounts from being compromised due to the data exposed or lost by the compromised account. For example, many card holders use the same PIN for multiple accounts. Thus, even though only one account is compromised, restricting access to the associated accounts prevents the PIN of the compromised account from being used to access the associated accounts.

In some embodiments, it is unnecessary to automatically cancel all of the accounts. The potentially compromised accounts may be put on a watch list by the issuer 28A, 28B, or 28C or the notification service 25 for a predetermined period of time in response to the increased security risk. The accounts on the watch list are treated with a different assessment to prevent these cards from also being exposed due to the compromised account information. A higher level of security is provided such that normal account activity may be flagged. The determination of whether to cancel, freeze or place an account on a watch list may be made by the consumer 30 when registering with the notification service 25.

In some embodiments, the issuer 28A, 28B, or 28C may call or send a message to the consumer's mobile phone that one of his accounts has been compromised. The issuer 28A, 28B, or 28C also notifies the notification service 25 that the account has been compromised so that account is put on the watch list. The notification service 25 accesses all of the accounts that the consumer 30 has registered and any other associated accounts based on information shared with the compromised account. The notification service 25 automatically adds these additional accounts to the watch list. The issuers 28A, 28B, 28C are notified that the accounts placed on the watch list may be exposed to fraudulent activity. The notification service 25 also notifies the consumer 30 about which accounts may have been exposed to potential security failures and are now on the watch list. The consumer 30 may reply using the mobile phone that not only was one card lost, but an entire wallet was lost, so that all of the associated accounts are cancelled. The notification service 25 then notifies the issuers 28A, 28B, 28C to request cancellation of the associated accounts. Based on the notification received by the mobile phone from the notification service 25, the consumer 30 may also send a request directly to the issuer 28A, 28B, or 28C to cancel and reissue the associated accounts.

In some embodiments, the consumer's mobile device is used as a communication hub to contact the issuers 28A, 28B, 28C and the notification service 25 of potentially compromised accounts. The consumer 30 may call the issuer 28A, 28B, 28C or the notification server 25 using the mobile device to indicate that a card has been lost, stolen, etc. The issuer 28A, 28B, 28C or the notification server 25 informs the consumer 30 of other accounts that may also be compromised. The consumer 30 then identifies which accounts to provide enhanced security using the mobile device. This feature of the invention is described in more detail with reference to FIG. 5.

In some embodiments, the portable consumer device 32 is a mobile phone. The mobile phone receives a notification from an issuer 28A, 28B, or 28C or the notification service 25 that an account has been compromised and potentially exposed to fraudulent activity. The mobile phone informs the issuer 28A, 28B, or 28C or the notification service 25 that the compromised account is loaded on the mobile phone (i.e., the account is a "virtual card"). The issuer 28A, 28B, or 28C or the notification service 25 (or a third party agent acting on behalf of the issuer 28A, 28B, or 28C or the notification service 25) automatically sends a notification to the mobile phone to cancel the account information on the mobile phone. Immediately afterward, the issuer 28A, 28B, or 28C sends new account information to the mobile phone. Thus, the consumer 30 maintains valid account information on the mobile phone with only a slight interruption. The new account information may also be automatically registered with the notification service 25 for detecting potentially compromised accounts.

In some embodiments, the consumer 30 registers accounts with the notification service 25 and authorizes which actions are performed after a compromised account is identified. For example, after an account has been identified as compromised, the notification service 25 instructs a credit bureau to perform a credit check for the consumer 30 to put other financial institutions on notice that other consumer accounts may also be susceptible to fraudulent activity. In another example, consumer accounts may be linked (e.g., recurring payments, regular deposits, etc.). The consumer 30 may configure the notification service 25 to cancel an account that is identified as compromised, reissue a new account and re-establish links between the new account and the accounts linked to the cancelled account.

In some embodiments, the merchant 22 may also be notified of a potentially compromised account. For example, an on-line retailer may cancel an order after a compromised account notification is received from the notification service 25 such that the order is not shipped. Likewise, an airline may cancel a flight reservation after receiving a compromised account notice from the notification service 25 if the flight has not yet taken place. It is not necessary to notify all merchants; only those that have not yet completed the transaction paid for using the compromised account.

Figure 3:
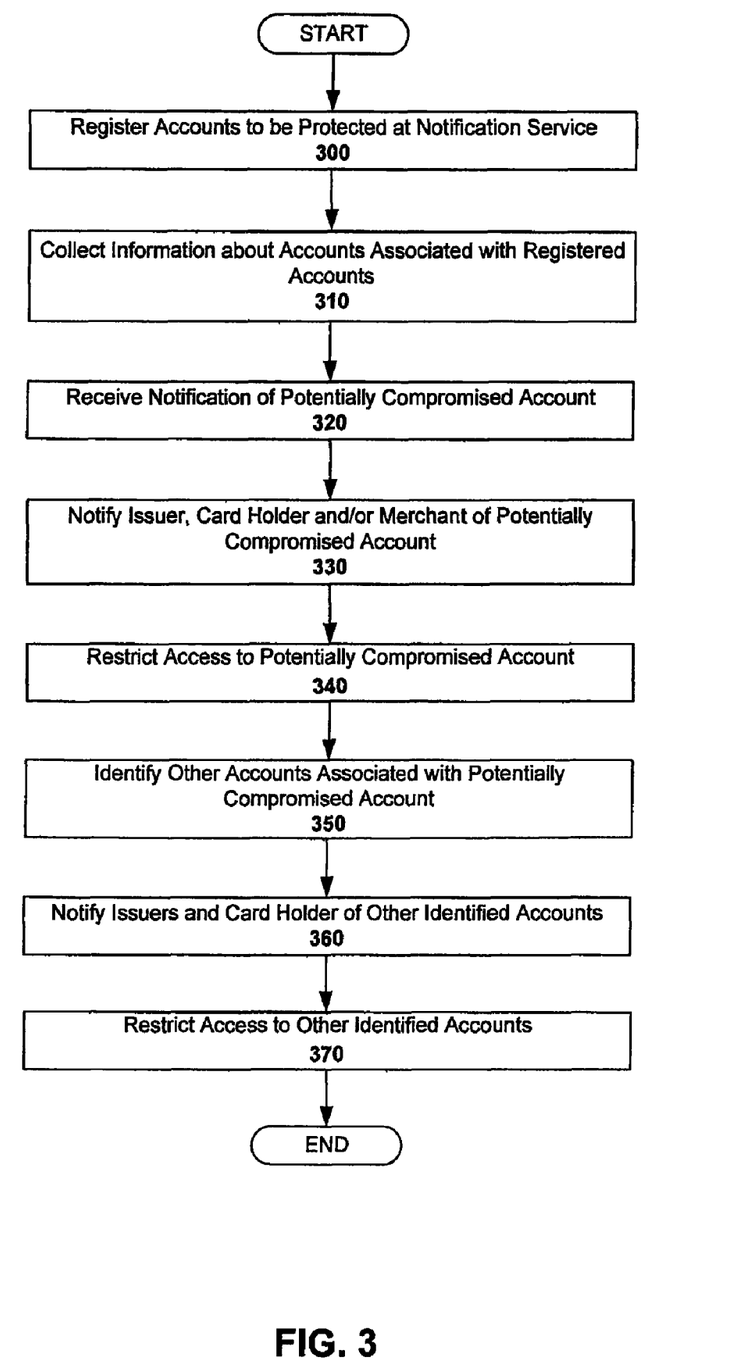
FIG. 3 is a flow diagram illustrating a method for restricting access to potentially compromised account information in accordance with embodiments of the present invention.

FIG. 3 is a flow diagram illustrating a method for restricting access to potentially compromised account information in accordance with embodiments of the present invention. A card holder may register different accounts for protection against exposure to fraudulent activity. The card holder registers the accounts with a notification service (step 300). The card holder may also configure the notification service to perform additional actions when an account is identified as being potentially compromised. For example, the card holder may not want to cancel any compromised accounts. Thus, the consumer configures the notification service to freeze or put all compromised accounts on a watch list.

The notification service collects information about accounts associated with the registered accounts (Step 310). Examples of account information that may be collected include personal information such as card holder name, billing address, date of birth, social security number, passwords, etc. In some embodiments, the notification service collects account information by monitoring the payment processing network. For example, as authorization requests and responses are sent over the payment processing network, the notification service can retrieve card holder account information. The retrieved account information may then be stored for subsequent access to identify accounts associated with a potentially compromised account. In another example, the notification service collects account information from financial details exchanged between the acquirer and the issuer during the normal clearing and settlement process conducted by the payment processing network.

A notification of a potentially compromised account is received at the notification service (step 320). The notification may be received from an issuer, a merchant or the card holder.

In some embodiments, the issuer or the merchant notifies the card holder of the potentially compromised account, and the card holder provides the notification to the notification service. In some embodiments, the issuer provides the notification to the notification service after detecting suspicious account activity that indicates a potentially compromised account, or after being contacted by the card holder that the account may have been compromised. In some embodiments, the merchant provides the notification to the notification server after determining that a security breach provided unauthorized access to account information. In some embodiments, the card holder provides the notification to the notification server after realizing that the account may be compromised (e.g., after losing a credit card, having a purse stolen, detecting an unauthorized transaction on an account statement, etc.).

The notification service then notifies at least one of the issuer, the card holder and the merchant of the potentially compromised account (step 330). In some embodiments, the card holder has registered a mobile device with the notification service and/or the issuer. The notification service or the issuer may contact the card holder directly via the mobile device to notify the card holder of the potentially compromised account. The merchant may be notified in the event that a transaction at the merchant has not yet been completed (e.g., an on-line retailer has not yet shipped an order paid for using the potentially compromised account).

Access is then restricted to the potentially compromised account (step 340). For example, the issuer may automatically close or freeze the potentially compromised account. Alternatively, the issuer may place the potentially compromised account on a watch list. The accounts on the watch list are provided with a higher level of security to prevent these accounts from fraudulent activity due to the potentially compromised account information. In some embodiments, normal account activity may be flagged due to an account being placed on the watch list.

Other accounts associated with the potentially compromised account are then identified (step 350). In some embodiments, the other accounts are associated with the same card holder as the potentially compromised account. These accounts may be the accounts provided by the card holder during registration with the notification service. In other words, the identified accounts are the accounts that the card holder sought to protect from being compromised due to the potentially compromised account information. However, the accounts may be identified as being associated with the same card holder even though the accounts have not been registered with the notification service. For example, accounts that share the same personal information as the potentially compromised account may be identified as being associated with the potentially compromised account. In other words, the accounts may be identified as being associated with the same card holder based on the account information collected from the payment processing network. In some embodiments, the identified accounts are associated with the same merchant as the potentially compromised account.

Issuers of the identified accounts are notified that the accounts may also be potentially compromised (step 360). In some embodiments, the card holder is also notified of the potentially compromised accounts.

Access is then restricted to the other accounts identified as potentially compromised (step 370). For example, the issuers may cancel or freeze the other potentially compromised accounts to prevent fraudulent activity due to the data associated with the original potentially compromised account that was lost or exposed. Alternatively, the issuers may put the potentially compromised accounts on the watch list. In some embodiments, the issuers restrict access to the accounts in response to approval from the card holder. By restricting access to the accounts that are associated with the initially compromised account, the associated accounts are also prevented from being compromised.

Figure 4:
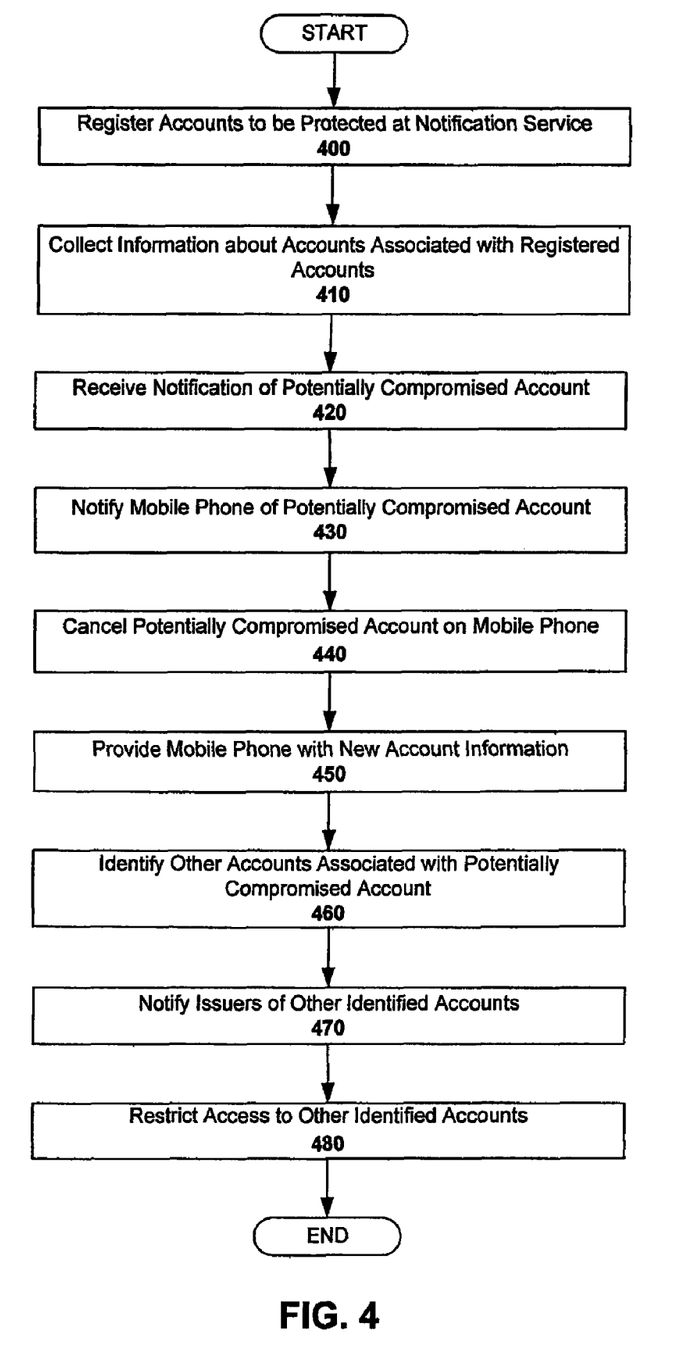
FIG. 4 is a flow diagram illustrating a method for notifying a mobile payment device of compromised account information and restricting access to the compromised account information in accordance with embodiments of the present invention.

FIG. 4 is a flow diagram illustrating a method for notifying a mobile payment device of compromised account information and restricting access to the compromised account information in accordance with embodiments of the present invention. A card holder may register different accounts to be protected against compromised account information. The card holder registers the accounts with a notification service (step 400). The card holder may also configure the notification service to perform additional actions. For example, the consumer may register the account as being associated with a portable payment device. The portable payment device may be a mobile device with a payment transaction application installed thereon. In this case, the mobile device is said to be configured as a "virtual card". The consumer may configure the notification service to notify the mobile device directly in the event that the account associated with the mobile device is identified as being compromised.

The notification service collects information about accounts associated with the registered accounts (Step 410). Examples of account information that may be collected include personal information such as card holder name, billing address, date of birth, social security number, passwords, etc. In some embodiments, the notification service collects account information by monitoring the payment processing network. In another example, the notification service collects account information during the normal clearing and settlement process conducted by the payment processing network.

A notification of a potentially compromised account is received at the notification service (step 420). The notification may be received from an issuer, a merchant or an acquirer. In some embodiments, in the event that the notification is not received from the issuer, the notification service provides the notification to the issuer.

The card holder's mobile device is also notified of the potentially compromised account (step 430). The issuer or the notification service may send the notification to the card holder's mobile device. In response, the card holder informs the notification service or the issuer via the mobile device that the potentially compromised account (i.e., the virtual card) is loaded on the mobile device. The issuer or the notification service then cancels the potentially compromised account from the mobile device (step 440).

The mobile device is provided with a new account (step 450). The new account may be provided directly from the issuer. The new account may also be automatically registered with the notification service. Any links between the cancelled account and other accounts may be re-established with the new account.

Other accounts associated with the potentially compromised account are identified (step 460). In some embodiments, the other accounts are associated with the same card holder as the potentially compromised account. These accounts may be the accounts provided by the card holder during registration with the notification service. However, the accounts may be identified as being associated with the same card holder even though the accounts have not been registered with the notification service. For example, the accounts may be identified as being associated with the same card holder based on the account information collected from the payment processing network and stored at the notification service. In another embodiment, the other accounts are associated with the same merchant as the potentially compromised account.

Issuers of the other identified accounts are notified that the other identified accounts may also be potentially compromised (step 470). In some embodiments, the mobile device directly notifies the issuers of the other potentially compromised accounts. In some embodiments, the issuers notify the mobile device of the other potentially compromised accounts. The card holder may also use the mobile device to inform the issuers which accounts to provide enhanced security (i.e., which accounts to cancel or place on the watch list).

Access is then restricted to the accounts that are identified as being potentially compromised (step 480). The issuer or the acquirer may automatically close, freeze, or place the other potentially compromised accounts on the watch list. In some embodiments, the notification service informs the issuers that access to the other potentially compromised accounts has been restricted. By restricting access to the accounts that are associated with original compromised account, the associated accounts are also prevented from being compromised.

Figure 5:
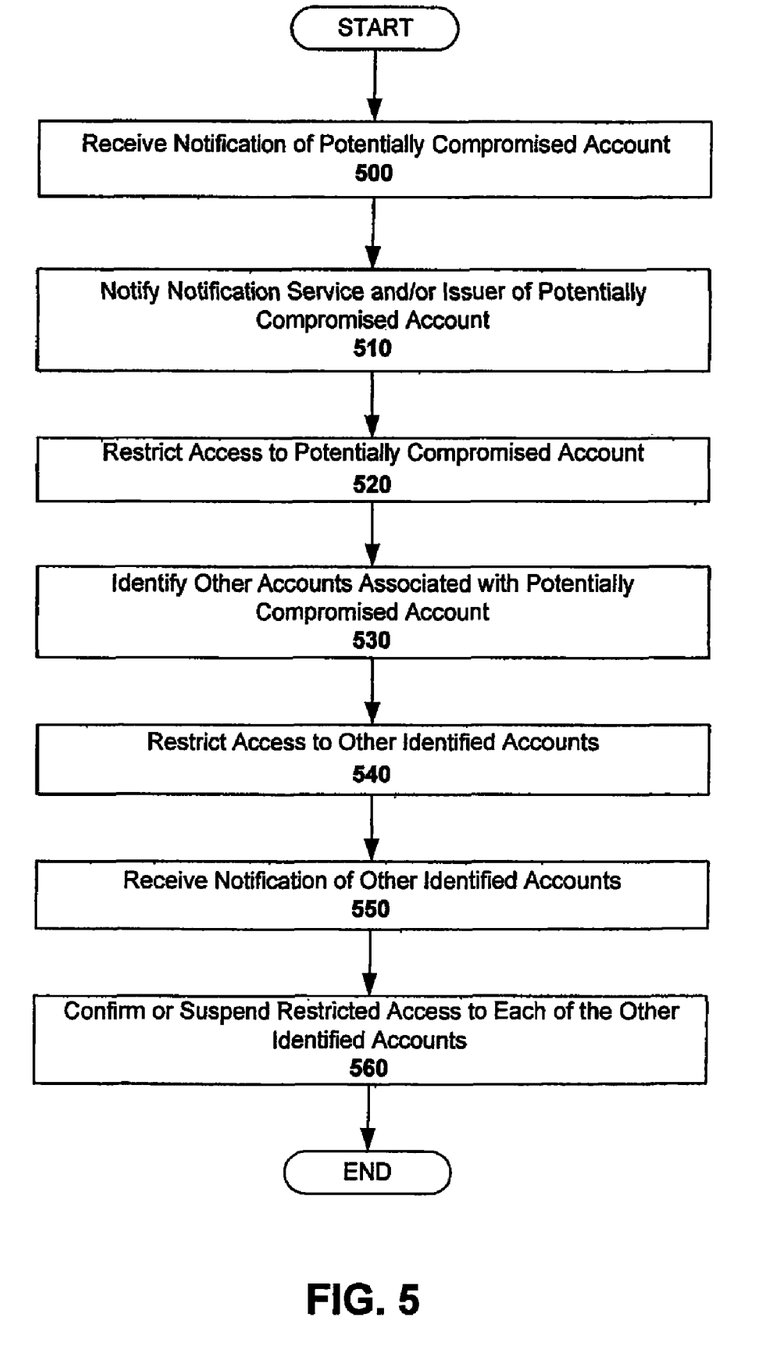
FIG. 5 is a flow diagram illustrating a method for using a mobile computing device as a communication hub for sending notifications of compromised account information in accordance with embodiments of the present invention.

FIG. 5 is a flow diagram illustrating a method for using a mobile computing device as a communication hub for sending notifications of compromised account information in accordance with embodiments of the present invention. The mobile computing device is associated with a card holder.

A notification of a potentially compromised account is received (step 500). The notification may be sent to the mobile computing device by the notification service or an issuer. For example, an issuer may call or send a message to the card holder's mobile computing device that one of his accounts has been compromised. Alternatively, the card holder may learn of the potentially compromised account independently. For example, the card holder may lose his wallet, misplace a credit card, or have other reasons to expect that the account is compromised (e.g., an unauthorized charge on a credit card statement.)

The mobile computing device notifies the notification service and/or the issuer of the potentially compromised account (step 510). In the event that the card holder independently learned of the potentially compromised account, the mobile computing device notifies both the issuer and the notification service of the potentially compromised account. Obviously, the mobile computing device need not notify the notification service (or the issuer) of the potentially compromised account if the notification service (or the issuer) initially notified the mobile computing device of the potentially compromised account. For example, in the event that the notification service notifies the mobile computing device of the potentially compromised account, the mobile computing device need only notify the issuer of the potentially compromised account.

Access is then restricted to the potentially compromised account (step 520). For example, the issuer may automatically close or freeze the potentially compromised account. Alternatively, the issuer or the notification service may place the potentially compromised account on a watch list.

Other accounts associated with the potentially compromised account that may have been exposed to fraudulent activity are identified (step 530). In some embodiments, the other accounts are associated with the same card holder as the potentially compromised account. For example, accounts that share the same personal information as the potentially compromised account may be identified as being associated with the potentially compromised account. In some embodiments, the identified accounts are associated with the same merchant as the potentially compromised account.

In some embodiments, the identification of other accounts can be performed inside of the mobile computing device (e.g.,
a mobile phone) or in conjunction with the mobile computing device. For example, three virtual credit cards A, B, and C may be associated with issuers A, B, and C, respectively. If the mobile computing device determines that credit card A associated with issuer A is initially compromised (e.g., through user input into the mobile computing device, or after receiving a message from issuer A), the mobile computing device may thereafter automatically call or otherwise notify the other issuers B and C that credit cards B and C may also be compromised. The issuers B and C may be notified using a wireless communication network such as a cellular telephone network. In this way, the mobile computing device can advantageously act as a communication hub with issuers A, B, and C, and also a potential link between virtual credit cards A, B, and C.

The network which is used as a communication medium between issuers A, B, and C and the mobile computing device for purposes of potential fraud notification can be different than the network that is used as a communication medium between issuers A, B, and C and the mobile computing device for purposes of conducting a payment transaction. For example, as noted above, the mobile computing device may use a cellular network to communicate with issuers A, B, and C if there is potential fraud. However, the mobile computing device may use a traditional payment network (e.g., including a POS terminal, an acquirer, a payment processing network, etc.) to communicate with issuers A, B, and C when conducting payment transactions.

Access is restricted to the other accounts identified as potentially compromised (step 540). Access is restricted to these accounts because they may have also been exposed to a security breach. Access to the accounts may be restricted in different ways. For example, the issuers may cancel or freeze the other potentially compromised accounts to prevent fraudulent activity due to the data associated with the original potentially compromised account that was lost or exposed. Alternatively, the issuers may put the potentially compromised accounts on the watch list. By restricting access to the accounts that are associated with the initially compromised account, the associated accounts are also prevented from being compromised.

The mobile computing device receives notification of the other identified accounts to which access has been restricted (step 550). The notification may be received from the notification service or from the issuer.

The mobile computing device notifies the issuer to confirm or suspend restricted access to each of the other identified accounts (step 560). In other words, the card holder identifies which accounts to provide enhanced security using the mobile computing device. For example, the card holder may notify the issuers to restrict access to all of the other identified accounts because her purse was stolen. Similarly, the card holder may request that restricted access to all of the other identified accounts be suspended because only one credit card was lost. In some embodiments, in response to the notification received from the notification service, the mobile device may directly contact the issuers with one request to cancel and reissue the compromised accounts.

Figure 6:
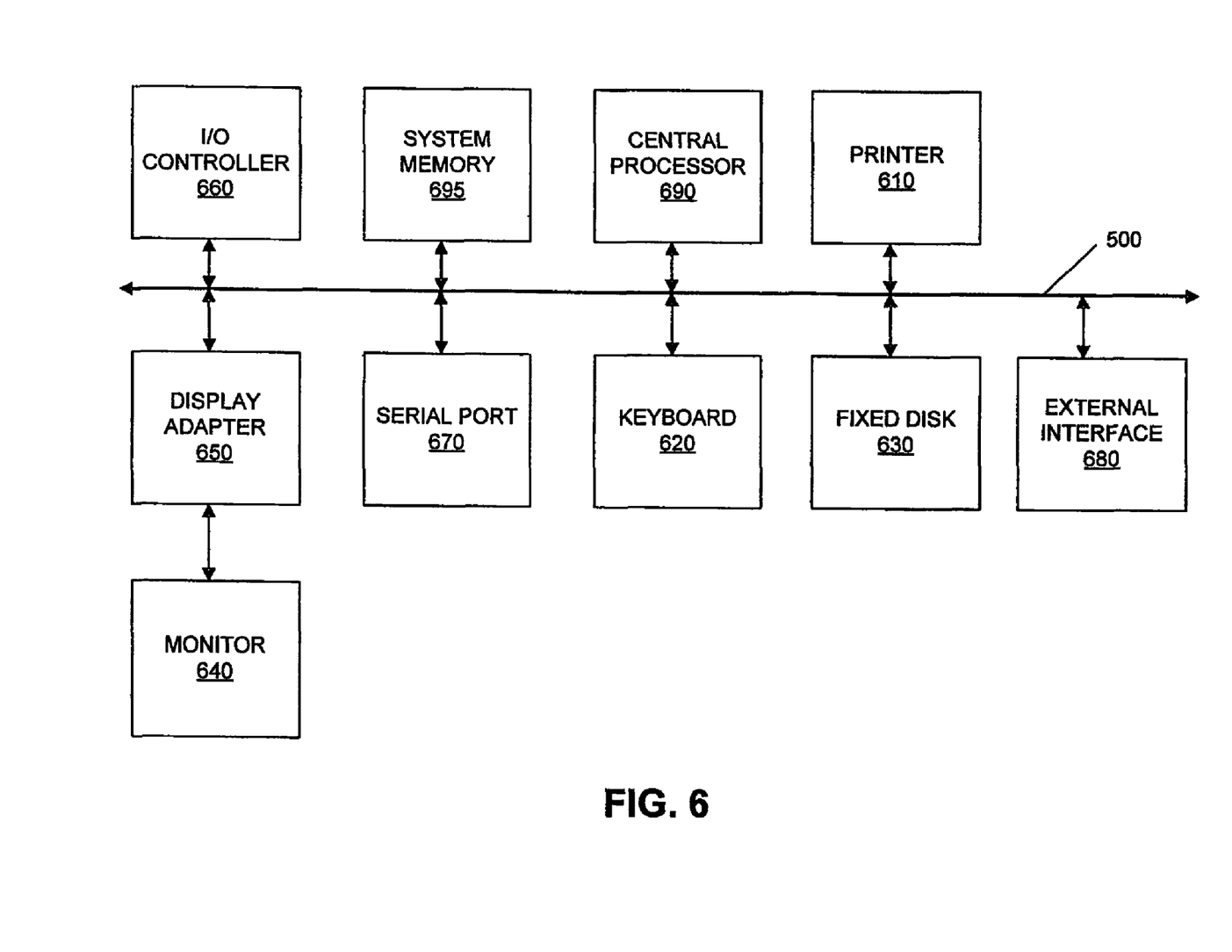
FIG. 6 shows typical components or subsystems of a computer apparatus.

FIG. 6 shows typical components or subsystems of a computer apparatus. Such components or any subset of such components may be present in various components shown in FIGS. 1 and 2, including the access device 34, server 21, etc. The subsystems shown in FIG. 6 are interconnected via a system bus 600. Additional subsystems such as a printer 610, keyboard 620, fixed disk 630, monitor 640, which is coupled to display adapter 650, and others are shown. Peripherals and input/output (I/O) devices, which couple to I/O controller 660, can be connected to the computer system by any number of means known in the art, such as serial port 670. For example, serial port 670 or external interface 680 can be used to connect the computer apparatus to a wide area network such as the Internet, a mouse input device, or a scanner. The interconnection via system bus 600 allows the central processor 690 to communicate with each subsystem and to control the execution of instructions from system memory 695 or the fixed disk 630, as well as the exchange of information between subsystems. The system memory 695 and/or the fixed disk 630 may embody a computer readable medium.

Figure 7:
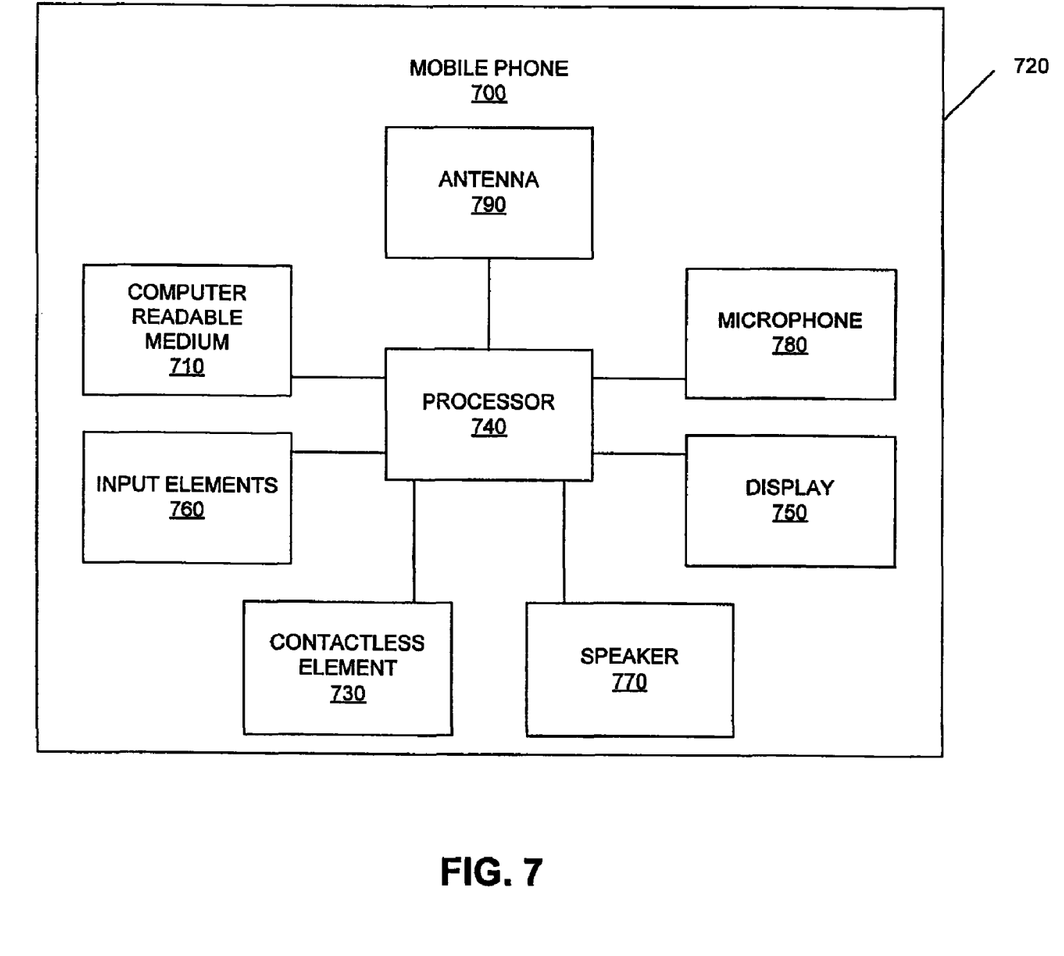
FIG. 7 shows a block diagram of some components of a mobile phone that may be used as a portable consumer device.

FIG. 7 shows a block diagram of some components of a mobile phone 600 that may be used as the portable consumer device 32. The phone 700 may comprise a computer readable medium 710 and a body 720. The computer readable medium 710 may be present within the body 720, or may be detachable from it. The body 720 may be in the form of a plastic substrate, housing, or other structure. The computer readable medium 710 may be a memory that stores data and may be in any suitable form including a magnetic stripe, a memory chip, etc.

The computer readable medium 710 may comprise code for performing any of the functions described herein. For example, the computer readable medium 710 may comprise code for identifying a consumer at an access device. The computer readable medium 710 may also comprise code for communicating with an access device to identify offers corresponding to items scanned by the phone 700.

The phone 700 may further include a contactless element 730, which is typically implemented in the form of a semiconductor chip (or other data storage element) with an associated wireless transfer (e.g., data transmission) element, such as an antenna. Data or control instructions transmitted via a cellular network may be applied to the contactless element 730 by a contactless element interface (not shown). The contactless element interface functions to permit the exchange of data and/or control instructions between the mobile device circuitry (and hence the cellular network) and the contactless element 730.

The contactless element 730 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 700 and the payment processing network 26 or it can be used to exchange data between the phone 700 and the access device 34. Thus, the phone 700 is capable of communicating and transferring data and/or control instructions via both cellular network and near field communications capability.

The phone 700 may also include a processor 740 (e.g., a microprocessor) for processing the functions of the phone 700 and a display 750 to allow the consumer to view offers associated with items that may be purchased and other information and messages. The phone 700 may further include input elements 760 to allow a user to input information into the phone 700, a speaker 770 to allow the user to hear voice communication, music, etc., and a microphone 680 to allow the user to transmit her voice through the phone 700. The phone 700 may also include an antenna 790 for wireless data transfer (e.g., data transmission).

As described above, the notification service in accordance with embodiments of the invention provides an improved method for restricting access to compromised account information. Access is restricted to an account that may be compromised and access is automatically restricted to other associated accounts that may also be compromised. A card holder registers different accounts with a notification service to protect the accounts from being exposed to fraudulent activity when one of the accounts is compromised. In contrast to conventional identify theft protections, other accounts associated with the compromised account may be identified even though the associated accounts are not registered with the notification service. The other accounts may be identified by information that is shared with the compromised account. The issuer of the compromised account may automatically close, freeze or place the compromised account and the associated accounts on a watch list to prevent potential exposure to the other accounts due to a security breach associated with the compromised account.

In addition, as described above, a mobile device associated with a card holder is used as a communication hub to contact issuers of potentially compromised accounts. A notification service notifies a cardholder's mobile device that one of his accounts has been compromised. The mobile device then notifies the issuer of the potentially compromised account, and the issuer restricts access to the account. The notification service identifies other accounts associated with the compromised account and notifies the mobile device of the associated accounts. Alternatively, the identification of other accounts associated with the compromised account can be performed inside of the mobile device or in conjunction with the mobile device. The card holder uses the mobile device to communicate with the issuers and identify which accounts to which access is to be restricted.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language, such as, for example, Java, C++ or Perl, using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. An apparatus for preventing a potentially fraudulent payment transaction, comprising:

an electronic processor programmed to execute a set of instructions;

a data storage device coupled to the processor; and the set of instructions contained in the data storage device, wherein when the set of instructions are executed by the processor, the apparatus operates to prevent a potentially fraudulent payment transaction by receiving notification of a compromised payment account of a consumer, the compromised payment account having previously been registered with a service operative to notify the consumer of the compromise of the payment account;

identifying a second payment account of the consumer, wherein the second payment account is identified based on information that is common to the compromised payment account and to the second payment account, the second payment account not having previously been registered with the service; and in response to identifying the second payment account, preventing the second payment account from being used to conduct a payment transaction.

2. The apparatus of claim 1, wherein the information that is common to the compromised payment account and to the second payment account is identification data of the consumer.

3. The apparatus of claim 2, wherein the identification data is one or more of the consumer name, the consumer billing address, the consumer date of birth, or the consumer social security number.

4. The apparatus of claim 1, wherein the information that is common to the compromised payment account and to the second payment account is identified by monitoring payment transaction messages communicated over a payment processing network.

5. The apparatus of claim 4, wherein the payment transaction message is an authorization request message or an authorization response message.

6. The apparatus of claim 1, wherein the information that is common to the compromised payment account and to the second payment account is identified by monitoring financial information exchanged between an acquirer and an issuer.

7. The apparatus of claim 1, wherein preventing the second payment account from being used to conduct a payment transaction further comprises one or more of notifying the consumer that the second payment account may be compromised, restricting access to the second payment account, notifying an issuer of the second payment account that the second payment account may be compromised, placing the second payment account on a watch list, or notifying a merchant that the second payment account may be compromised.

8. The apparatus of claim 1, wherein the notification is received from one or more of an issuer, a merchant, or the consumer.

9. The apparatus of claim 1, wherein the compromised payment account is associated with a payment device.

10. The apparatus of claim 9, wherein the payment device is accessed by the consumer's mobile phone.

11. The apparatus of claim 1, wherein the electronic processor is operated by one or more of a payment processor or an issuer.

12. A method of preventing a potentially fraudulent payment transaction, comprising:

receiving notification at an electronic computing device of a compromised payment account of a consumer, the compromised payment account having previously been registered with a service operative to notify the consumer of the compromise of the payment account;

identifying, by the electric computing device, a second payment account of the consumer, wherein the second payment account is identified based on information that is common to the compromised payment account and to the second payment account, the second payment account not having previously been registered with the service; and in response to identifying the second payment account, preventing, by the electronic computing device, the second payment account from being used to conduct a payment transaction.

13. The method of claim 12, wherein the information that is common to the compromised payment account and to the second payment account is identification data of the consumer.

14. The method of claim 13, wherein the identification data is one or more of the consumer name, the consumer billing address, the consumer date of birth, or the consumer social security number.

15. The method of claim 12, wherein the information that is common to the compromised payment account and to the second payment account is identified by monitoring payment transaction messages communicated over a payment processing network.

16. The method of claim 15, wherein the payment transaction message is an authorization request message or an authorization response message.

17. The method of claim 12, wherein the information that is common to the compromised payment account and to the second payment account is identified by monitoring financial information exchanged between an acquirer and an issuer.

18. The method of claim 12, wherein preventing the second payment account from being used to conduct a payment transaction further comprises one or more of notifying the consumer that the second payment account may be compromised, restricting access to the second payment account, notifying an issuer of the second payment account that the second payment account may be compromised, placing the second payment account on a watch list, or notifying a merchant that the second payment account may be compromised.

19. The method of claim 12, wherein the notification is received from one or more of an issuer, a merchant, or the consumer.

20. The method of claim 12, wherein the compromised payment account is associated with a payment device.

21. The method of claim 20, wherein the payment device is accessed by the consumer's mobile phone.

22. The method of claim 12, wherein the electronic computing device is operated by one or more of a payment processor or an issuer.

* * * * *